United States Patent

[11] 3,609,305

[72] Inventors Cecil J. Davis;
Robert T. Matthews, both of West Chester, Pa.

[21] Appl. No. 870,621
[22] Filed Oct. 29, 1969
[45] Patented Sept. 28, 1971
[73] Assignee Bridge Data Products Inc.
Philadelphia, Pa.

[54] CARD READER
19 Claims, 7 Drawing Figs.

[52] U.S. Cl. 235/61.11 E, 250/219 DC, 271/61
[51] Int. Cl. B65h 1/00, G01m 21/30, G06k 7/10
[50] Field of Search 235/61.11 R, 61.111–61.117, 61.7; 250/219 D, 219 DC, 219 LG, 219 WE, 227; 350/96; 340/380; 270/61; 209/110

[56] References Cited

UNITED STATES PATENTS

| | | | |
|---|---|---|---|
| 2,059,254 | 11/1936 | Lasker | 271/61 |
| 3,335,265 | 8/1967 | Apfelbaum | 235/61.11 E |
| 3,389,241 | 6/1968 | Harvey | 235/61.11 R |

*Primary Examiner*—Maynard R. Wilbur
*Assistant Examiner*—Thomas J. Sloyan
*Attorney*—Seidel, Gonda & Goldhammer

ABSTRACT: A card reader both 80 and 96 column punched cards and includes a feeder and stacker that can feed and stack both types of cards.

INVENTORS.
CECIL J. DAVIS
ROBERT T. MATTHEWS
BY
Seidel, Gonda & Goldhammer
ATTORNEYS.

INVENTORS.
CECIL J. DAVIS
ROBERT T. MATTHEWS
BY
Seidel, Gonda & Goldhammer
ATTORNEYS.

INVENTORS.
CECIL J. DAVIS
ROBERT T. MATTHEWS
BY
Seidel, Gonda & Goldhammer
ATTORNEYS.

INVENTORS
CECIL J. DAVIS
ROBERT T. MATTHEWS
BY
Seidel, Gonda & Goldhammer
ATTORNEYS.

CARD READER

This invention relates to a card reader. More particularly, this invention relates to a card reader that is capable of reading both the currently conventional 80 column punched card as well as the newly adopted 96 column punched card.

The punched card is one of the more conventional means by which data is fed into a computer. The form of the current punched card consists of 80 columns of 12 rectangular holes in a card that measures 7⅜ by 3¼ inches and is 0.007 inch thick. The 80 columns are numbered 1 through 80 from left to right, and the 12 rows are numbered 12, 11, 0, 1, 2, 3, 4, 5, 6, 7, 8, 9 from top to bottom. The upper left corner of the card is usually cut although cards with uncut corners, or a cut upper right corner may be found. These cards can be fed, depending upon the computer, face up, face down, 12 edge first, or 9 edge first since they are completely symmetrical.

The so-called 80 column punched card has been completely standardized and is the most universally used.

Recently a new card has been introduced by International Business Machines Corporation (IBM). This new card known as the System/3 card is one-third the size of the 80 column card and yet is capable of containing 20 percent more data. The new card has 96 columns divided into 3 vertically aligned groups of 32 columns with 6 rows in each column. In other words, there are 18 vertically aligned holes in a column divided into 3 groups of 6 holes per group. The new card uses round holes as compared to the rectangular holes in the eighty column card.

There are certain basic similarities between the 80 column card and what will hereinafter be referred to as the 96 column card. Among these is the fact that the punched holes in each card have the same center to center pitch. The importance of this for the purpose of this invention will become apparent from the following.

It is rapidly becoming apparent that the new 96 column punched card will soon become the standard card in the industry. Even if it does not become the standard card, it certainly is going into extensive use side-by-side with the current 80 column card. It therefore is apparent that card readers will have to be developed to read both the 80 column card and the 96 column card. Accordingly, it is a purpose of the present invention to provide such a card reader.

In accordance with the present invention, there is provided a card reader which is capable of reading through the use of optics both an 80 column and a 96 column punched card. Moreover, the card reader is provided with apparatus for feeding cards from stacks of either type into the reader and with apparatus for stacking cards of either type as they are removed from the reader.

For the purpose of illustrating the invention, there are shown in the drawings forms which are presently preferred; it being understood, however, that this invention is not limited to the precise arrangements and instrumentalities shown.

Figures 1, 2:
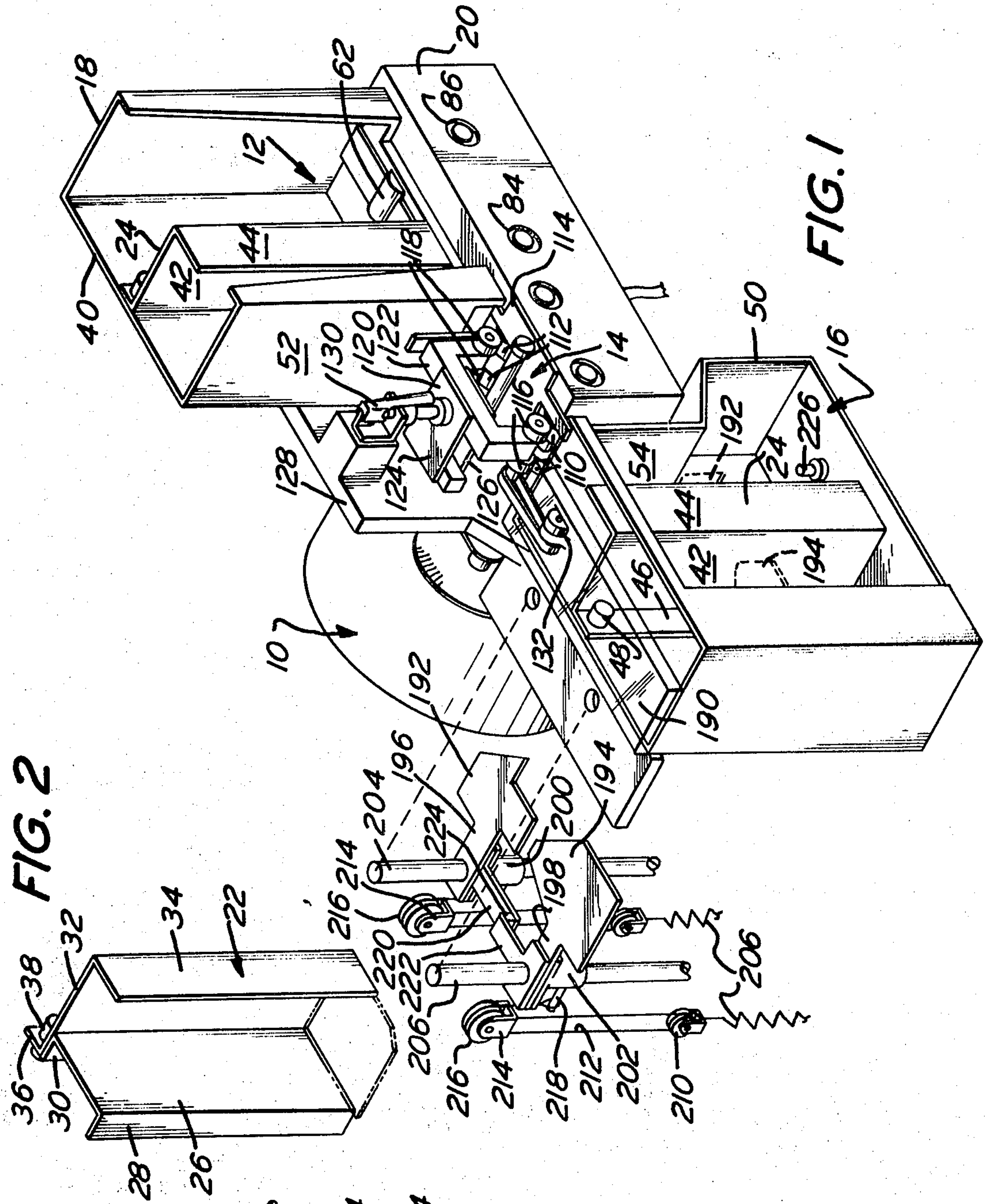
FIG. 1 is a perspective view of the card reader in accordance with the present invention.
FIGS. 2 and 3 are perspective views of magazines used with the card reader in accordance with the present invention.

The present invention is directed toward a card reader that has the capability of reading both the standard 80 column punched card as well as the newer 96 column punched card. The card reader described herein feeds, reads and stacks both types of cards even though they differ quite substantially in dimensions. Moreover, the present card reader is capable of reading the 96 column card in face up and face down positions even though, unlike the 80 column punched card, it is not symmetrical about its longitudinal and vertical axis. The 96 column card has an asymmetrical hole pattern such that when rotated from its face up to fits face down position the hole pattern is displaced approximately one-eighth of an inch. The present card reader is capable of reading both the 80 and 96 column cards in all 4 of their face up and face down orientations.

With the foregoing in mind, reference should now be had to the drawings in detail, wherein like numerals indicate like elements.

FIG. 1 illustrates the card reader designated generally as 10 comprising in general terms a feed station 12, a read station 14 and an output stacker 16.

Figures 4, 7:
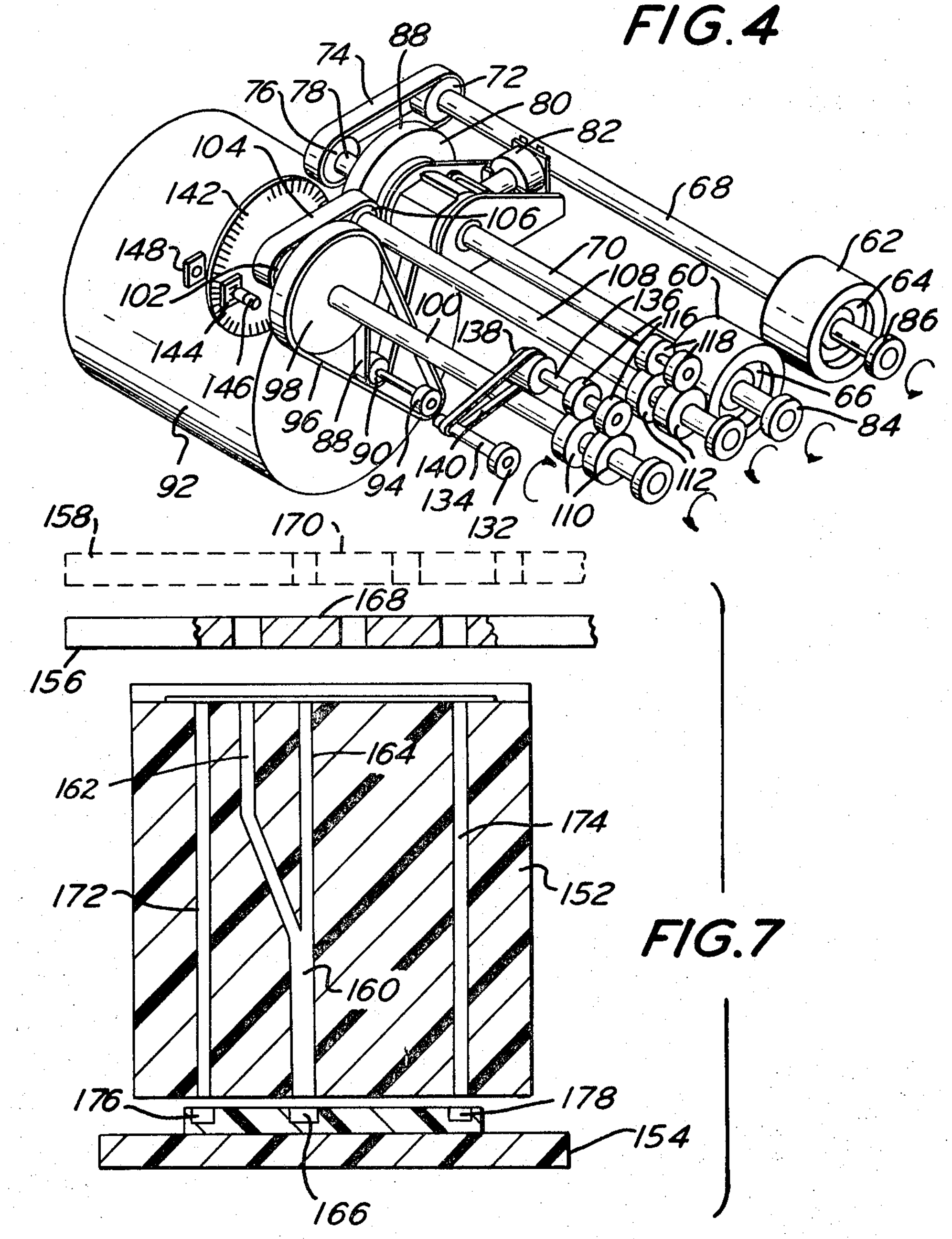
FIG. 4 is a perspective view of the feed mechanism for the cards.
FIG. 7 is a transverse sectional view of the fiber optic array used in the optical card reader of FIGS. 5 and 6 taken along the line 7—7.

The feed station 12 includes a rectangular hopper 18 supported on the topmost surface of a frame 20 for the feed and drive mechanism illustrated in FIG. 4. The hopper 18 is dimensioned so as to accept and contain the standard 80 column card whose outside dimensions are standardized at a nominal height of 3.250 inches and a length of 7.375 inches. The inner dimensions of hopper 18 should be just slightly larger than those given so that the card may be readily placed therein in either a face up or a face down condition. As shown, the hopper 18 is positioned so that the cards are fed lengthwise into the read station 14.

Figure 3:
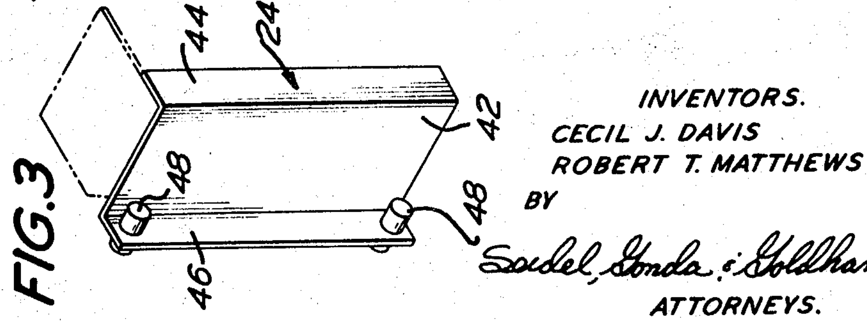

In order to convert the hopper 18 to receive the 96 column cards, the magazines 22 and 24 illustrated in FIGS. 2 and 3, respectively, are provided. Magazine 22 cooperates with hopper 18 so that the 96 column cards may be contained in a face down condition. The magazine 24 cooperates with the hopper 18 so that the 96 column cards may be contained in a face up condition.

Magazine 22 comprises a back wall 26 with dependent flanges 28 and 30 extending therefrom. Flange 30 is fixed to sidewall 32 which in turn supports a dependent flange 34 extending parallel to back wall 26. Walls 26 and 32, together with flange 34 define a pocket for receiving the 96 column cards in a face down conditions as illustrated. A flange 36 depends from sidewall 32 and extends parallel to back wall 26. Flange 36 supports a pair of pins such as the pin 38 which are adapted to be received in openings in the back wall 40 of the hopper 18. This retains the magazine in position.

Magazine 24 provides for the conversion of hopper 18 into a container for the 96 column cards in the face up condition. As shown, magazine 24 comprises a sidewall 42, and a pair of dependent flanges 44 and 46 extending in opposite directions and normal to the plane of sidewall 42. Thus, the magazine 24 has a Z-shape. A pair of pins 48 extend through flange 46 and mate with holes in the back wall 40 of hopper 18 to retain the magazine 24 in position.

In accordance with the present invention, the magazines 22 and 24 can be used not only in conjunction with the hopper 18 but also for converting the hopper 50 used in association with the output stacker 16. The only difference in using the magazines 22 and 24 in either the hopper 18 or the hopper 50 is that they are inverted 180°. For example, reference should be had to the magazine 24 as illustrated in FIG. 1 and positioned within the hopper 18. As thus positioned, it contains 96 column cards in a face up condition between the magazine sidewall 42 and the hopper sidewall 52. The same magazine 24 is illustrated in position within hopper 50 except that it has now been inverted 180° about a transverse axis so that the flanges 44 and 46 now extend in opposite directions. As thus positioned within the hopper 50, the magazine 24 contains the 96 column cards between the sidewall 42 and the sidewall 54 of hopper 50.

The magazine 22 as illustrated in FIG. 2 in position for use and association with the hopper 18 contains 96 column cards in a face down position. As constructed, the flanges 28 and 30 displace the back wall 26 away from the back wall 40. This displacement is approximately one-eighth of an inch so as to account for the asymmetrical nature of the 96 column card.

From the foregoing, it can be seen that there has been provided magazines 22 and 24 which are capable of being used either in association with the hopper 18 for the feed station or in association with the hopper 50 for the stacker 16.

The punched cards stacked within the hopper 18 are fed and conveyed to the read station 14 by a feeder mechanism that consists of two high friction rollers 60 and 62 supported by unidirectional bearing clutches 64 and 66 as illustrated in FIG. 4. The rollers 60 and 62 extend above the surface of the bottom of hopper 18 so as to engage the bottommost card in any stack and project it longitudinally forward toward the read station 14. Roller 62 is illustrated in FIG. 1.

Unidirectional bearing clutches 64 and 66 are mounted on shafts 68 and 70, respectively. Shaft 68 is driven by pulley 72 which in turn is driven by belt 74. Belt 74 extends around pulley 76 which is fixed to stub shaft 78. Stud shaft 78 and shaft 70 are each connected to pulley 80 through clutch mechanism 82. In other words, clutch 82 serves to engage and disengage pulley 80 with the shafts 70 and 78. Clutch mechanism 82 is preferably a one-third revolution clutch. In other words, upon engagement it rotates the shafts 70 and 78 through one-third of a revolution and then disengages. Thus, three punch cards can be fed with each revolution of either shaft 70 or shaft 68. One-third revolution clutch 82 is conventional and available on the market and hence need not be described in detail. It is sufficient to state that is is operated by a solenoid which in turn is energized by operation and the proper control circuitry. Moreover, the ends of shafts 70 and 68 are appropriately supported in bearings 84 and 86 mounted in the frame 20.

As previously indicated, rollers 60 and 62 are mounted on unidirectional clutch bearings 64 and 66. This means that rollers 60 and 62 can be driven in a counterclockwise direction by shafts 70 and 68 as indicated. It also means that rollers 60 and 62 can be freely rotated in the counterclockwise direction when shafts 70 and 68 are at a standstill. This is necessary since the conveyor drive will engage each card as it is fed off the bottom of the stack and pulled forward while the shafts 68 and 70 are at a standstill. This means that the rollers 60 and 62 must be able to rotate without applying undue frictional forces to the bottom surfaces of the cards. This is a particular necessity when feeding the longer 80column card which must pass over roller 68. The unidirectional clutch bearings 66 and 64 permit this to be accomplished.

Pulley 80 is driven by belt 88 which in turn is driven by pulley 90 fixed to the output of drive motor 92. Drive motor 92 is preferably a 1/6-horsepower split phase induction motor which rotates at approximately 1140 revolutions per minute.

The output of motor 92 also drives pulley 94 which in turn drives belt 96. Belt 96 drives pulley 98 which is fixed to shaft 100. Shaft 100 drives pulley 106 through belt 104 and pulley 102. Pulley 106 is fixed to shaft 108. Thus, shafts 100 and 108 are driven in synchronism at the same speed. Shaft 100 supports in fixed relation thereon a pair of drive wheels 110. In like manner, shaft 108 supports in fixed relation thereon a pair of drive wheels 112. Drive wheels 110 and 112 are identical and preferably have carborundum surfaces for developing frictional engagement with the bottom surface of each card. As shown in FIG. 1, drive wheels 110 and drive wheels 112 are mounted so as to project above the transparent surface 114 for engagement with the face of each punched card.

Pressure idler wheels 116 and 118 engage drive wheels 110 and 112, respectively. As best illustrated in FIG. 1, pressure idler wheels 116 and 118 are clamped against drive wheels 110 and 112 by an idler roller clamp 120. Idler roller clamp 120 comprises a yoke 122 which supports the pressure idler wheels 116 and 118 on appropriate bearings as illustrated. The yoke 122 is in turn supported by two platelike springs 124 and 126 which are fixed to wall 128. The springs 124 and 126, and hence the idler wheels 116 and 118, are biased downwardly by an overcenter, spring-loaded pressure clamp 130. The overcenter pressure clamp 130 includes an overcenter device which permits it to remain in either of two positions. It is shown in FIG. 1 in its pressure applying position.

From the foregoing, it can be seen that the drive wheels 112 in cooperation with the pressure idler wheels 118 will first engage a punched card fed from hopper 18 and carry it forward toward the hopper 50. Thereafter, the drive wheels 110 in cooperation with the pressure idler wheels 116 will engage the lead edge of the card and continue to convey it forward toward the hopper 50. The space between the drive wheels 112 and 110 is the read station. The drive wheels and associated idler wheels are positioned so as to avoid any slippage of the card as it passes through the read station 14.

The drive system also provides a nudge roller 132 mounted on shaft 134. Shaft 134 is driven by idler rollers 116 through shaft 136, pulley 138 and belt 140. The nudge roller 132 is positioned shown in FIG. 1 over the top of hopper 50 so as to engage each card driven by drive rollers 110 as it moves into the hopper. The nudge roller engages either the 80column or 96column card and makes certain that it continues in the forward direction sufficiently far to completely enter the hopper 50.

A timing disc 142 is mounted on the end of the shaft 100 and hence rotates at the same speed as drive wheels 110. The timing disc has an etched pattern on its periphery which in conjunction with a stationary complementary pattern on plate 144 develops a series of pulses as the disc 142 rotates. Light is developed and projected by light source 146. The light so projected passes through plate 144, the periphery of the disc 142 and is incident upon photocell 148. In one embodiment of the present invention, the rotating disc 142 develops 16 light pulses for each 0.087 inches of movement of a card. This figure is chosen because the holes in both the 96 and 80 column cards is 0.087 inches center to center. Thus, each 16 pulses is indicative of the progress of a card from one column to the next. The photocell is of course connected through an amplifier to a counter (not shown).

The system described immediately above provides a dynamic timing system that aids in reading the punched cards in a conventional manner. Since the timing disc 142 is mounted on the drive shaft 100, any change in the motor speed results in a change in the timing disc as well as a change in the card speed. Hence, the timing pulses provide for very reliable reading.

Figure 5:
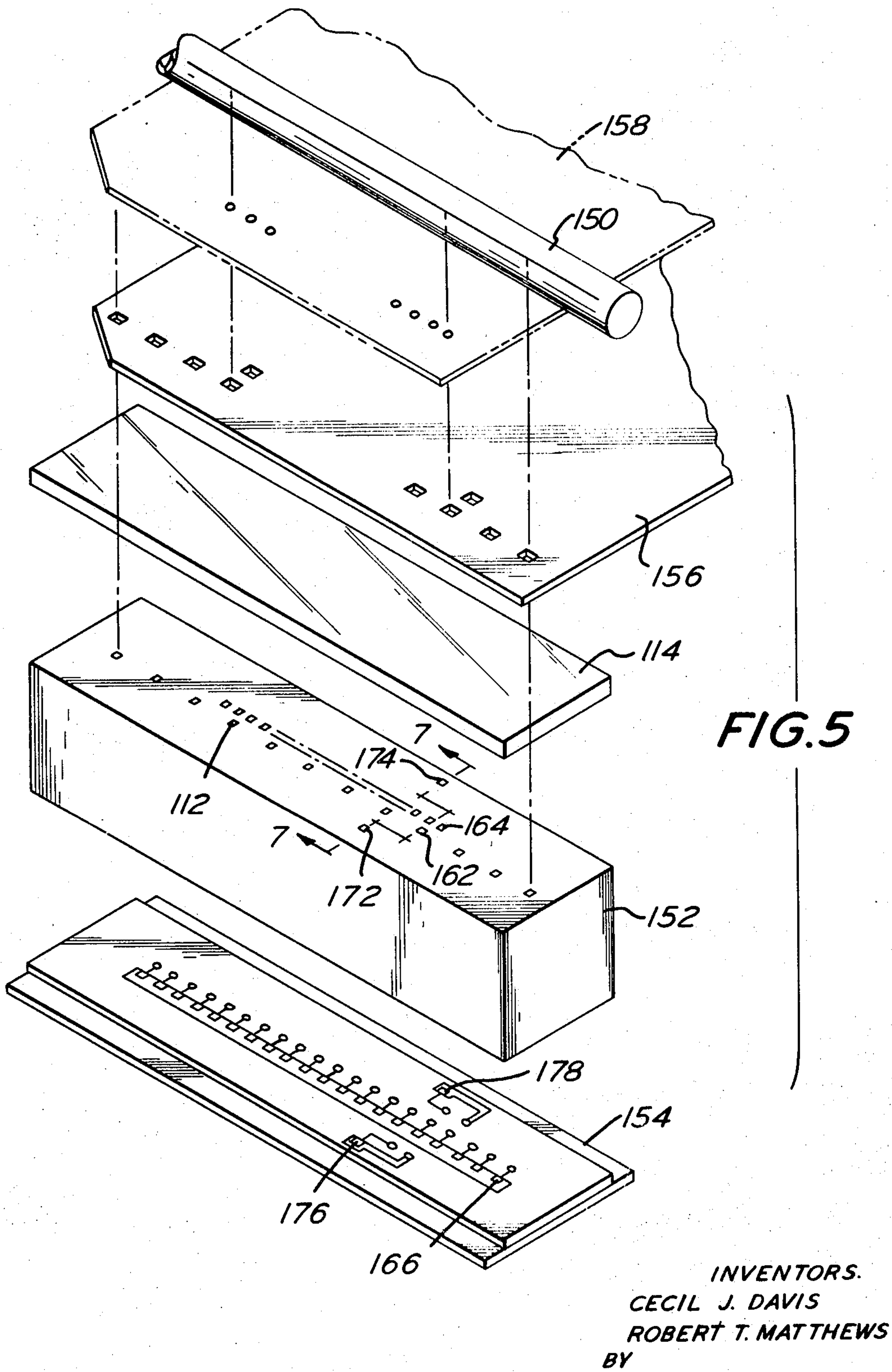
FIG. 5 is an exploded perspective view of an optical card reader.

As previously indicated, the read station 14 is located between drive wheels 110 and 112. As best shown in FIG. 5, the read station includes a light source which may take the form of an elongated filament lamp 150 which generates light energy and projects it downwardly through the holes in the cards and then through the transparent platform surface 114 over which the cards ride. The lamp is sufficiently long so that is provides light which passes through each column in a card as it sequentially passes beneath the source 150.

Positioned beneath the transparent surface 114 is a fiber optic module 152 which supports a plurality of fiber optic devices in a predetermined alignment with the holes in the 96 and 80 column cards as described hereinafter. Generally, the fiber optic module 152 provides means for conducting light passing through the holes to a photocell module 154 on which are mounted a number of photocells for detecting the presence or absence of a hole in a predetermined position on either of the cards by determining the presence or absence of light.

For purpose of convenience in explanation, both an 80 column card 156 and a 96 column card 158 are shown in a read position immediately below the lamp 150 (FIG. 5). The card 158 is shown in dotted form since in actual operation the card reader does not read both types of cards simultaneously. The illustration of both types of cards in position for reading their first column does, however, illustrate the fact that the first column of the 80 card is positioned closer to the lead edge than the first column of the 96 column card 158. Indeed, the distance from the lead edge of the 80 column card to the center of a hole for the first column is 0.250 inches. On the other hand, the distance from the lead edge of a 96 column card to the center of a hole in the first column is 0.293 inches. See FIG. 7 where the foregoing concepts are schematically illustrated.

There are 12 possible holes in each column of an 80 column card. In a like manner, there are 18 possible holes in each column of a 96 column card. As the columns of the cards do not line up with each other when the lead edges of the cards are aligned, it should therefore follow that there has to be 30 photoelectric sensing device in order to read both type of columns for either type of card. This, of course, is one solution to the reading problem. However, in accordance with the present invention, it has been found that the number of photoelectric devices for reading the card holes can be reduced to 18 which is the number of holes in the 96 column card 158. This is accomplished by providing the fiber optic module 152 intermediate the cards being read and the photocell module 154. The fiber optic module 152 consists primarily of an array of fiber optic bundles in a support structure such as epoxy potting. As best illustrated in FIG. 7, a number of the fiberoptic bundles 160 are Y-shaped in that they have two input channels for receiving light passing through holes in cards from source 150 and a single output channel through which the light is emitted and incident upon an aligned photocell in the photocell module 154.

The branches 162 and 164 of the fiber optic bundle 160 terminate at the top surface of module 152. As shown, branch 162 is positioned to receive light passing through a hole in a column of 80 column cards 156. In a like manner, branch 164 is positioned to receive and accept light passing through a hole in a column of 96 column cards 158. Although entering at different positions, the light is conducted by the branches 162 and 164 to the base stem or output channel of fiber optic bundle 160 and is emitted in a common position relative to the photocell module 154. This means that a photosensitive device positioned adjacent the output channel of fiber optic bundle 160 will receive light passing through a hole in either column of the cards 156 and 158.

By providing 12 such devices in the fiber optic module 152, the 12 input channels of which branch 162 is representative for the 80 column cards can be combined with 12 of the 18 fiber optic input channels for the 96 column card. As a result, only 18 light sensitive devices are required for the photocell module 154. In other words, 12 of such devices are common to both the 96 column card and the 80 column card. As to the remaining six required input channels 164 for the 96 column cards, they are single channel bundles.

Of course, the input channels 162 and 164 are aligned to receive light passing through the holes in the column of the card with which they are to be associated. As illustrated in FIG. 5, light emitted by source 150 passes through 80 column card 156 and is incident upon one of the input channels 162. This light passes out through the output channel of a fiber optic bundle and is incident upon one of the 18 phototransistors 166 which are part of the photocell module 154. FIG. 5 also illustrates light being emitted from the source 150 and passing through a hole in a column of the card 158. If a straight line were continued downward to the surface of fiber optic module 152, the light would be incident upon one of the 18 input channels 164. This light in turn would be conducted down to one of the phototransistors 166 by an appropriate fiber optic bundle 160. This fiber optic bundle may or may not be a Y-shaped bundle.

In actual operation, only one of the cards 156 or 158 will be present. This means that either the input channels 162 or the input channels 164 must be masked from each other, depending upon which type of card is being sensed. In the embodiment illustrated in FIG. 5, the masking is provided by appropriately positioning the input channels 162 and 164 in spaced relation with respect to each other one-half column width apart so that the webs between columns in each card act as masking devices. This concept is illustrated by referring to FIG. 7. As shown, the 80 column card 156 is in position so that light passing through a hole is received by the input channel 162. On the other hand, the web 168 between holes in the card 156 overlies channel 164 and hence effectively blocks the same. In a like manner, a hole in card 158 is shown over the input channel 164. As the card 158 advances so that the next hole is aligned with the input channel 164, the web 170 will mask input channel 162. Thus, the positioning of the input channel makes possible the use of the cards as their own masking devices. This in turn is possible because the center to center distance between holes in both types of cards is the same, namely 0.087 inches.

In addition to the fiber optic bundle 160, the fiber optic module 152 is provided with fiber optic bundle 172 and fiber optic bundle 174. These latter fiber optic bundles 172 and 174 merely provide for the conduction of light from the surface of module 152 down to the phototransistors 176 and 178. When positioned as shown in FIG. 5, fiber optic bundle 172 together with phototransistor 176 acts as a means for detecting the presence of a card by sensing the leading edge thereof. Fiber optic bundle 174 in combination with photocell 178 is used to determine the end of the card. The photocells 176 and 178 are, of course, connected to appropriate and conventional circuitry for this purpose. It should be indicated that photocells 166 are connected to well known and conventional logic circuitry for "reading" each column of holes in each card.

Figure 6:
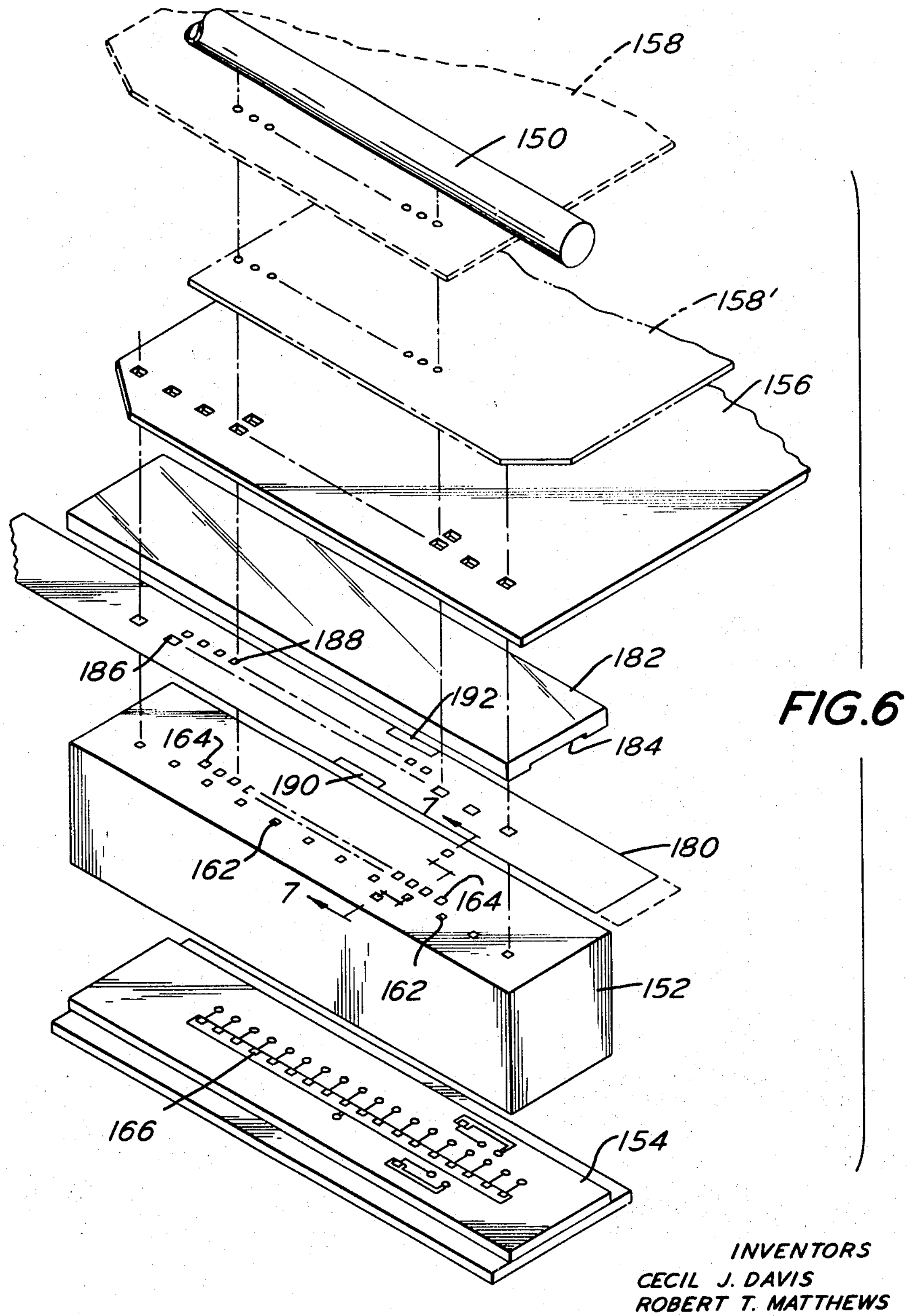
FIG. 6 is a perspective view of another form of an optical card reader.

Referring now to FIG. 6, there is illustrated a modification of the read station illustrated in FIG. 5. The embodiment of FIG. 5 uses the webs between the cards to act as masks so that the data photocells 166 in association with their respective fiber optic bundles 160 can distinguish between one type of card and the other. In the embodiment of FIG. 6, a mask 180 is provided for this purpose. As shown, the mask 180 is positioned on the top surface of the fiber optic module 152 and held in place by a transparent guard 182. Guard 182 is provided with a channel 184 within which the mask 180 may be longitudinally or vertically displaced.

The mask 180 is provided with two sets of aperture patterns 186 and 188 corresponding to each of the two types of cards whose columns of holes are to be read. The mask is selectively movable to one of two positions. In one position, the set of apertures exposes the sets of 12 input channels 162 and at the same time covers or masks the sets of 18 input channels 164 in the fiber optic module. In the second position, the set of 12 input channels 162 is masked and the set of 18 input channels 164 is exposed to light from source 150. The apertures 186 are in alignment with each other and the apertures 188 are in alignment with each other. The sets of apertures 186 and 188 are one-half column pitch apart. Mask 180 is also provided with elongated aperture windows 190 and 192 for allowing light to pass through the mask to the fiber optic bundles 172 and 174 regardless of the masked position.

FIG. 6 also illustrates the 96 column card 158 in both a face up and a face down position. The uppermost card 158 is in a face up position while the lower card 158' is in a face down position. It should be noted that the face down card 158' has its lateral edges displaced to the right as viewed in FIG. 6 so that the holes in its columns are aligned to the positions of the holes in face up card 158. This displacement is provided by the aforesaid magazine back wall 26.

Other than the incorporation of the mask 180, the read station 14 operates in the same manner as described with respect to FIG 5.

In addition to the former read stations represented by the apparatus illustrated in FIGS. 5 and 6, it is also possible to simply use two sets of 18 and 12 data phototransistors in the photocell array 154. In this instance, the fiber optic module 152 could be modified to eliminate the Y-shaped fiber optics. In other words, each fiber optic bundle would have only one input channel and one output channel and would be associated with one of the 30 data phototransistors.

As previously indicated, each card is conveyed from the read station 14 to an output stacker 16 by the drive wheels 110 and their associated pressure idler wheels 116.

As illustrated in FIG. 1, the output stacker 16 comprises a hopper 50 into which are fed the punched cards that have been read. The hopper 50 accommodates both 80 column and 96 column punched cards. It can be converted from one form to another by the use of the manually connected and disconnected magazines 22 and 24. The magazine 24 is shown in position within the hopper 50 so that it may receive and stack 96 column cards. If the magazine 24 is removed, the hopper would be in condition to receive 80 column cards.

The cards passing between drive wheels 110 and idler wheels 116 pass below the transparent plate 190 and are received on either platform 192 or both platform 192 and platform 194. Thus, platform 192 receives and supports the 96 column cards. On the other hand, platforms 192 and 194 in combination receive and support 80 column cards.

Platforms 192 and 194 are each supported in cantilever fashion within the hopper 50 by brackets 196 and 198 which are fixed to tubular slides 200 and 202, respectively. The slide 200 is positioned for reciprocable sliding motion on post 204. The slide 202 is positioned for reciprocable sliding motion on post 206.

Each platform 192 and 194 is balanced by a mechanical bias mechanism so as to maintain the topmost card closely adjacent to the top of the hopper 50. This means that the topmost card can be readily read through the transparent plate 190 which acts as an access cover for the top of the hopper 50. The balance mechanism for each of the platforms 192 and 194 is the same with the exception that the spring biasing force used varies according to the weight of the cards supported by the platforms. As shown, the balance mechanism for the platform 194 comprises a spring 208 fixed at its lowermost end (not shown) and connected at its uppermost end to pulley 210. Pulley 210, is in turn supported by wire 212 which extends around it. One end of wire 212 is fixed in position to sheave 214 for pulley 216. The wire 212 also extends around pulley 216 and is fixed to peg 218 which extends from slide 202.

As thus connected, the balance mechanism for platform 194 biases it toward the top of hopper 50. Spring 206 is chosen so that the force developed by the weight of the cards on platform 194 causes it to expand against its spring force. Hence, platform 194 automatically lowers itself into hopper 50 as cards are added.

As shown in FIG. 1, a similar balance mechanism is provided for platform 192. Accordingly, this balance mechanism will not be described in detail.

As previously indicated, the platform 192 by itself supports the 96 column cards. On the other hand, platforms 192 and 194 together support the 80 column cards. In order to provide for this, the tab 220 extends outwardly from bracket 196 toward bracket 198. In a like manner, a tab 222 extends outwardly from bracket 198 toward bracket 196. Tab 220 is of sufficient length so that it underlies tab 222. Tab 220, however, is not connected to tab 222. Rather, it merely abuts a resilient pad 224 which is fixed to the bottom of tab 222. Pad 224 abuts tab 220 when platform 192 is at the same level as platform 194.

When either magazine 22 or magazine 24 is inserted in hopper 50, platform 192 operates independently of platform 194. Thus, 96 column cards are received by platform 192 in the read station 14. As cards are stacked on the platform, it begins to lower itself into hopper 50 against the bias of its balance mechanism. When this happens, tab 220 moves away from tab 222. If, on the other hand, hopper 50 is adapted to receive 80 column cards, both platforms 192 and 194 operate. The 80 column cards are of sufficient length to overlie both platforms. This means that their combined weight will operate against the bias of both balance mechanisms and lower the platforms 192 and 194 simultaneously. Simultaneous lowering is assured by the force action of tab 222 to resilient pad 224 on tab 220.

A switch 226 is provided in the bottom of hopper 50 to sense when platform 192 has been lowered against it and hence determine when the hopper is full. Switch 226 closes appropriate electrical circuitry for shutting down the feed and drive mechanisms.

Finally, it should be noted that hopper 50 is open at its front side so that access can be readily had for the removal of stacked cards.

It should be understood that although the present invention has been described in relation to a standard 80 column punched card as well as the newly adopted 96 column punched card, it is equally adaptable for use with punched cards having any number of columns spaced at the same column pitch as the 80 column card. THus, it is merely a matter of modifying the fiber optic module 152 and photocell module 154 to accommodate a punched card with a different number of columns. Such modification would be obvious to those skilled in the art having knowledge of the principles of the present invention. Still further, it should be recognized that the card reader 10 can be modified to feed, read and stack three or more kinds of punched cards merely by modifying the feed station 12, read station 14 and output stacker 16 in accordance with the principles described herein.

The present invention may be further modified so that the read station simultaneously reads two or more data columns rather than a single column as described herein. Such a modification merely requires the provision of appropriate fiber optic input and output channels in the fiber optic module 152 as well as appropriate data photocells in the photocell module 154. In addition, an appropriate mask can be provided.

The present invention may be embodied in other specific forms without departing from the spirit or essential attributes thereof.

I claim:

1. A reader for reading both a 80 column punched card and a 96 column punched card comprising a light source for projecting light through a column of holes in either card, conveyor drive means for conveying either card past said light source, a fiber optic array comprising at least 18 fiber optic input channels aligned to receive light passing through holes in a column of a 96 column punched card and at least 12 fiber optic input channels aligned to receive light passing through holes in a column of a 80 column card, at least 18 fiber optic output channels for passing out light from either said 12 input channels for said 80 column card or light from 12 of said 18 input channels for said 96 column card, a photocell array for receiving light from said 18 output channels and transducing it into electric signals, and means for selecting whether light is directed to either the 18 or the 12 fiber optic input channels.

2. A reader in accordance with claim 1 wherein said selecting means comprises a selectively positionable mask for alternately blocking the 18 or the 12 fiber optic input channels.

3. A reader in accordance with claim 1 wherein said selecting means comprises positioning the 18 or 12 fiber optic input channels one-half column pitch apart so that the web of a 96 column card acts as a mask for the input fiber optic channels for the 80 column card and the web of an 80 column card acts as a mask for the fiber optic input channels for a 96 column card.

4. A reader in accordance with claim 1 wherein 12 of said 18 output fiber optic channels are made common to both the 18 and 12 input channels by means of Y-shaped light conducting means.

5. A reader in accordance with claim 1 including a feed mechanism comprising a hopper for containing 80 column cards, a magazine for converting said hopper to a 96 column face up container, and a magazine for converting said hopper to a 96 column face down card container.

6. A reader in accordance with claim 1 wherein said conveyor drive means includes a feed mechanism comprising two feed rollers for feeding either 80 column cards or 96 column cards from the bottom of a stack, and drive wheels and cooperating pressure rollers for conveying said cards fed by said feed rollers, said feed rollers being selectively engageable with a motor drive means by a clutch means.

7. A reader in accordance with claim 6 wherein said feed rollers are mounted on their respective shafts by unidirectional bearings.

8. A reader in accordance with claim 6 wherein said clutch means includes means to disengage said feed rollers from the motor drive after only a partial revolution.

9. A reader in accordance with claim 6 wherein said feed rollers are mounted on their respective shafts by unidirectional bearings, and said clutch means included means to disengage said feed rollers from the motor drive after only a partial revolution.

10. A reader in accordance with claim 1 including a card stacker, said stacker including a hopper positioned to receive cards after they have been conveyed past said light source, and a mechanically biased platform for maintaining the topmost card of the card stacked within said hopper adjacent the top of said hopper.

11. A reader in accordance with claim 10 wherein said stacker includes a hopper for containing 80 column cards, and a magazine for converting said hopper to a 96 column face up card container, and a magazine for converting said hopper to a 96 column face down card container.

12. A reader in accordance with claim 10 including a feed mechanism comprising a hopper for containing 80 column cards, a magazine for converting said hopper to a 96 column face up card container, and a magazine for cônverting said hopper to a 96 column face down card container, said magazines for said hoppers for said feed mechanism being the same as said magazine for said hopper for said stacker.

13. A reader in accordance with claim 10 wherein said platform is subdivided into two platforms, each platform being mechanically biased to maintain the topmost card in a stack supported thereby adjacent the top of the hopper, means joining said two platforms to support in combination a stack of 80 column cards, one of said platforms being positioned to receive and support a stack of 96 column cards independently of the other platform.

14. A reader in accordance with claim 1 wherein said 96 column punched card has round holes and said 80 column punched card has rectangular holes.

15. A reader in accordance with claim 1 wherein said conveyor drive means includes drive rollers and idler rollers, and releasable means for biasing said idler rollers against said drive rollers.

16. A reader in accordance with claim 1 including a card stacker, said stacker including a hopper, said hopper being open at the side thereof, and having light transparent means at the top thereof.

17. A reader for reading two or more types of punched cards wherein each type has a different number of data columns, each of said data columns being comprised of a plurality of regularly spaced data points defined by the presence or absence of holes, wherein the first data column in each type of punched card is spaced a different distance from its leading edge, and each of said cards has the same column pitch comprising, a light source for projecting light through a column comprised of said holes in each type of card, conveyor drive means for conveying each type of card past said light source, a light conducting array having a plurality of sets of input channels, said sets of input channels being spaced from each other in proportion to the distance between the first data column and the leading edge in each type of data card, each set of input channels being aligned to receive light passing through said holes in a column of its respective type of card, the number of channels in each set of input channels corresponding to the number of data points in its respective type of card to be read, said light conducting array including means for reducing the number of output channels to be equal to the greatest number of data points required for one card, a photocell array for receiving light from said output channels and transducing it into electrical signals, and means for directing light to one of the sets of input channels.

18. A reader in accordance with claim 17 wherein said selecting means comprises a selectively positionable mask for blocking all but the selected input channel.

19. A reader in accordance with claim 17 wherein said selecting means exposes two or more input channels to said light source for reading two or more columns simultaneously.